United States Patent
Kostka et al.

(10) Patent No.: US 6,539,789 B1
(45) Date of Patent: Apr. 1, 2003

(54) DETECTION OF IRREGULARITIES IN A CONVEX SURFACE, SUCH AS A TIRE SIDEWALL, USING BAND-PASS FILTERING

(75) Inventors: Guenther Kostka, Erlangen (DE); Peter Schmitt, Erlangen (DE); Ulf Hassler, Heilsbronn (DE); Randolf Hanke, Fuerth (DE)

(73) Assignee: Fraunhofer-Gesellschaft zur Foerderung der Angewandten Forschung e. V., Munich (DE)

( * ) Notice: Subject to any disclaimer, the term of this patent is extended or adjusted under 35 U.S.C. 154(b) by 0 days.

(21) Appl. No.: 09/807,740

(22) PCT Filed: Aug. 12, 1999

(86) PCT No.: PCT/EP99/05860

§ 371 (c)(1),
(2), (4) Date: Jul. 16, 2001

(87) PCT Pub. No.: WO00/25088

PCT Pub. Date: May 4, 2000

(30) Foreign Application Priority Data

Oct. 28, 1998 (DE) .......................................... 198 49 793

(51) Int. Cl.$^7$ .............................................. E01C 23/00
(52) U.S. Cl. ........................................................ 73/146
(58) Field of Search ................................. 73/146, 146.2, 73/146.3, 146.5, 146.8; 340/442–448; 152/415, 419; 356/348, 347, 375, 376, 360, 3.01, 3.03; 250/559.29, 559.31, 559.4, 202; 318/577, 640

(56) References Cited

U.S. PATENT DOCUMENTS 4,225,238 A * 9/1980 Rottenkolber ............... 356/458
4,327,580 A * 5/1982 Suzuki et al. ................. 73/146
4,402,218 A 9/1983 Engel ............................. 73/146
5,024,529 A * 6/1991 Svetkoff et al. ............ 356/3.04
5,245,867 A * 9/1993 Sube et al. ..................... 73/146
5,421,197 A * 6/1995 Ohms ............................ 73/146
5,864,145 A * 1/1999 Krimermann et al. ...... 250/202
6,092,414 A * 7/2000 Newman ........................ 73/146

FOREIGN PATENT DOCUMENTS

| DE | 38 01 297 | 1/1988 | ............ G01D/1/00 |
| DE | 39 31 132 | 9/1989 | ............ G01B/21/30 |
| DE | 43 04 451 | 2/1993 | ............ G01B/21/30 |
| DE | 44 42 980 | 12/1994 | ............ G01B/11/24 |

\* cited by examiner

*Primary Examiner*—Max Noori
*Assistant Examiner*—Charlene Dickens
(74) *Attorney, Agent, or Firm*—Glenn Patent Group; Michael A. Glenn

(57) ABSTRACT

A device for the contactless detection of a potentially existing essentially edge-free irregularity in a convex surface, which has a structuring that is delimited by edges, comprises a unit for creating a three-dimensional representation of the surface, a unit for extracting the convexity from the three-dimensional representation of the surface and for smoothing the edges of the structuring so as to obtain a convex-free representation of the convex surface which exhibits the irregularity and the structuring, whose edges have now been smoothed, a unit for comparing the convex-free representation with a threshold value so as to identify areal regions of the convex-free representation which are determined by a predetermined relationship to the threshold value, and a unit for analyzing the areas of the identified regions, a region being detected as an irregularity if its area exceeds a predetermined area. When this device is used to carry out quality control of tires, bulges or constrictions can therefore be identified with certainty in real-time operation and can be distinguished from an inscription or marking which has been intentionally provided on the tire.

12 Claims, 5 Drawing Sheets

DETECTION OF IRREGULARITIES IN A CONVEX SURFACE, SUCH AS A TIRE SIDEWALL, USING BAND-PASS FILTERING

FIELD OF THE INVENTION

The present invention relates to industrial quality control, and in particular to the industrial quality control of products with weakly structured relief-type surfaces, when checking for fabrication faults which manifest themselves as a specific anomaly in the surface shaping.

BACKGROUND OF THE INVENTION

In industrial quality control a frequent task is to investigate convex surfaces for fabrication faults in situations where the convex surface exhibits deliberately created structurings in addition to any fabrication faults which may be present. One of the most important applications in this context is the detection of so-called bulges or constrictions on the tire sidewalls of vehicles. The chief difficulty in the detection of such fault features lies in the fact that the areas under test exhibit raised relief-type letters or other markings which are provided intentionally, that the letter and fault structures lie within the same height interval or that the faults to be detected can have a smaller depth than the structures introduced during manufacture, and moreover that the side surfaces under test exhibit a torus-shaped curvature. As a consequence, a simple threshold value decision on the basis of measured form data does not lead to an unequivocal distinction between faults and lettering. It should also be borne in mind that there are many tire manufacturers, each of them offering a multitude of tire types. Each tire type can have different dimensions and therefore a different tire sidewall curvature. Furthermore, each tire type will have a different inscription. While the manufacturer's inscription is normally much the same from one tire type to another, the designation of the tire type itself and further information to be found on tires vary markedly from one type to another. Tire inscriptions are generally such that a manufacturer's letters e.g. do not protrude from the tire sidewall but are surrounded by a raised symbol such as a triangle when seen in cross section, the symbol normally emerging sharply, i.e. with an edge, from the surface of the tire. In addition there may be other edge-delimited raised portions which, however, normally occupy relatively small areas.

In the production of vehicle tires, fabrication faults in the inner construction may arise which significantly affect the mechanical properties and thus the stability behaviour. Such fabrication faults, e.g. in the steel network around which the tire rubber is arranged, are visible on the outside as localized bulges or constrictions. Such products must be removed. These construction faults are liable to occur particularly on the sidewalls and are thus superimposed on the undisturbed torus-shaped surface of the tire. The lateral and vertical dimensions of such defective structures are comparable with the constructional ones which are also present, i.e. intentional structuring on the surface in the form of raised letters or markings.

Until now capacitive measurement methods have primarily been employed to perform these checks in the industrial sphere, but these cannot provide an adequate level of checking. During the movement of the surface, i.e. during a rotation of the tire, a change in the capacitance of the measurement sensor is used to detect a change in the distance between the measurement electrode and the surface of the tire. The distance here is of the order of 1 cm. The disadvantage of this method lies in its geometrically related relatively crude lateral spatial resolution, as a consequence of which it is only possible to measure sensibly a small number of tracks across the width of the test area. The measurement signal does not contain sufficient information on the precise geometry of a height deviation. Additionally, it is not possible to distinguish between lettering and fault structures since both structures can lie within the same height range relative to the surrounding surface. The resulting detection threshold for faults must therefore generally be chosen higher than the height of the lettering to avoid provoking permanent pseudofault detection due to constructional structures.

Despite the preponderant use of this method the industrial user is in need of a test method which permits certain fault detection for height deviations of the same order as the size of the constructional lettering or marking structures.

DESCRIPTION OF PRIOR ART

A known method for measuring surface contours is optical triangulometry, also called the light intersection method. Here a narrow light beam, generally a laser beam, is directed onto the surface to be measured and the diffusely reflected radiation is optically mapped onto a sensor having a number of picture elements, i.e. pixels. If the geometry between the camera and the light beam remains unchanged, the change in the spatial position of the light intersection point on the measured object along the beam can be calculated from a shift in the projected light point on the sensor surface.

In the first instance such a measurement is for a point. If a whole region is to be checked, the test object is moved under the triangulator measurement setup from one side to the other and the measured values are recorded rapidly so that a small circular structure on the tire sidewall is detected.

A disadvantage of this method, however, is that up to now it is not possible by means of post-circuited data processing to distinguish between the fault structures, i.e. bulges and constrictions, and the raised lettering. With this method fault structures can be detected only for heights which markedly exceed that of the lettering, so that, apart from the improved resolution in the radial direction, there are no advantages worth mentioning compared with the capacitive method.

A further development of the light intersection method is achieved by scanning the surface with a fan beam and an area sensor. The light line projected onto the sensor can be used to determine the height information along the line of measurement on the convex surface. By moving the object the height information is recorded line by line and is then combined to form a complete data record. The data record created in this way contains the height information from a whole surface region, including the faults and the lettering and marking structures. However, since lettering and fault structures lie within the same height range and these structures also lie on a surface which is strongly curved compared with these structures, it has not yet been possible, using the data thus acquired, to achieve certain distinction, by means of a threshold value decision, between actual fault irregularities and the intentional structuring in the form of lettering and marking.

DE 44 42 980 C2 discloses a device and a method for the frictionless detection of the contour of a convex surface, wherein a unit creates a three-dimensional representation of the surface.

DE 43 04 451 A1 discloses a device and a method for the frictionless detection of an irregularity, such as a seam e.g., also in a convex surface, e.g. rubber layers used in the construction of tires, wherein a unit creates sectional views of the surface.

U.S. Pat. No. 4,402,218 discloses a device and a method for detecting a potentially existing essentially edge-free irregularity in a convex surface, wherein a unit creates a representation of the surface.

DE 39 31 132 A1 discloses a device and a method for detecting irregularities, such as a rough patch e.g., on a convex surface, wherein one unit creates data representing the surface and another unit extracts the convexity from this representation.

DE 38 01 297 A1 discloses a method for detecting surface irregularities and creating data in digital form as a representation of the surface; furthermore the shortwave structurings are smoothed by appropriate damping of the associated harmonic components of the surface curve and a representation of the surface is created which comprises the longwave irregularities, the shortwave ones being smoothed.

SUMMARY OF THE INVENTION

It is the object of the present invention to provide a device and a method for the contactless detection of an essentially edge-free irregularity in a convex surface, which has a structuring that is delimited by edges, which enable a better distinction to be made between faulty irregularities and the edge-delimited structuring.

In accordance with a first aspect of the present invention, this object is achieved by a device for the frictionless detection of a potentially existing essentially edge-free irregularity in a convex surface, which has a structuring that is delimited by edges, comprising: a unit for creating a three-dimensional representation of the surface; a unit for extracting the convexity from the three-dimensional representation of the surface and for smoothing the edges of the structuring so as to obtain a convex-free representation of the convex surface which exhibits the potentially existing irregularity and the structuring, whose edges have now been smoothed; a unit for comparing the convex-free representation with a threshold so as to identify areal regions of the convex-free representation which are determined by a predetermined relationship to the threshold value; and a unit for analyzing the areas of the identified regions, a region being detected as an irregularity if its area exceeds a predetermined area.

In accordance with a second aspect of the present invention, this object is achieved by a method for the frictionless detection of a potentially existing essentially edge-free irregularity in a convex surface, which has a structuring that is delimited by edges, comprising the following steps: creating a three-dimensional representation of the surface; extracting the convexity from the three-dimensional representation of the surface and smoothing the edges of the structuring so as to obtain a convex-free representation of the convex surface which exhibits the potentially existing irregularity and the structuring, whose edges have now been smoothed; comparing the convex-free representation with a threshold so as to identify areal regions of the convex-free representation which are determined by a predetermined relationship to the threshold value; and analyzing the areas of the identified regions, a region being detected as an irregularity if its area exceeds a predetermined area.

The present invention is based on the finding that, although the irregularity in a convex surface and the structuring may have the same height, they differ markedly in their delimitation. The irregularity, e.g. in the form of a constriction or a bulge on one of the tire sidewalls, exhibits an essentially edge-free, i.e. continuous, transition to the undisturbed convex surface. On the other hand a structuring, which is deliberately imposed on the convex surface, is characterized by the fact that it is delimited by edges, i.e. that the transition from the convex surface to the structuring is abrupt and sharply delimited. According to the present invention, therefore, the specific differences between the two form types is exploited, after three-dimensional detection of the convex surface, to achieve a selective smoothing of the structuring without influencing the irregularities which are to be detected. Based on the fact that the irregularities which are to be detected are locally delimited on the convex surface, the convexity of the convex surface is also extracted without influencing the irregularity or the structuring.

In this way a convex-free representation of the convex surface is obtained which exhibits the irregularities which are to be detected and the structuring, the edges of which are smoothed, however. What is involved here is, in a way, a quasi-planar post-processed representation of the tire sidewall, which can be subjected to a threshold value decision so as to mark areal regions whose height lies above or below the threshold value. Through a subsequent analysis of the areas of the detected regions, irregularities are separated from any "remains" of the structuring, which may still be present in some circumstances, when the area of the irregularity determined by the threshold value decision is greater than a predetermined area.

The edge-delimited structuring is not completely eliminated by the post-processing. Instead, the edges are simply smoothed, the height of the structuring also being affected as a result of the smoothing operation. In consequence the region which remains from a structuring after the threshold value is considerably reduced if not completely suppressed by the data processing while the essentially edge-free irregularities are scarcely affected if at all. As a result an analysis of the areal regions after the threshold value decision in relation to a predetermined area enables an irregularity to be distinguished from a structuring to a high degree of accuracy regardless of whether the height or the extent of the structuring is close to the height and extent of the bulges or not.

A preferred application of the concept according to the present invention relates to the quality control of tires where the tire sidewalls are checked for bulges or constrictions. A constriction, i.e. depression in relation to the undisturbed convex surface, can always be assumed if an areal region is detected which lies below a negative height threshold value, since tires do not normally exhibit structurings which penetrate into the tire sidewall.

The structurings normally inscribed on tires are so constituted that letters or other data are represented by means of prominent borders with relatively small cross-sections. Insofar as these borders are not already completely brought below the threshold value by the smoothing, they will give rise to only very small areas in the analysis of the areas of the detected regions, thus enabling a simple distinction to be made between the structuring and the bulges since bulges will normally have a relatively large dimension. The device and the method according to the present invention thus permit automatic quality control of tire sidewalls which can be performed in real time if the cameras for registering the tire and the image processing architecture are fast enough.

BRIEF DESCRIPTION OF THE DRAWINGS

Preferred embodiments of the present invention are described in more detail below making reference to the enclosed drawings, in which.

DETAILED DESCRIPTION OF PREFERRED EMBODIMENTS

The device according to the present invention includes a unit 10 for creating a three-dimensional representation of the surface. The three-dimensional representation of the surface is passed to a unit 20 for extracting the convexity from the three-dimensional representation of the surface and for smoothing the edges of the structuring so as to obtain a convex-free representation of the convex surface which exhibits the irregularity and the structuring, whose edges have now been smoothed. The convex-free representation created by the unit 20 for extracting and smoothing is passed to a unit 30 for comparing with a threshold value so as to identify areal regions of the convex-free representation which are determined by a predetermined relationship to the threshold value. In a preferred embodiment for checking the sidewall of a tire the threshold value comprises both a positive threshold value for identifying bulges and also a negative threshold value for identifying constrictions. The areal regions which have been identified by the unit 30 for comparing may still include "remains" of the structuring. The areal spread due to structuring above the threshold value will generally be considerably smaller than the areal spread of the bulges above the threshold value to the extent that the bulges can be distinguished from the structuring by means of an area analysis on the basis of the area size.

Figure 1:
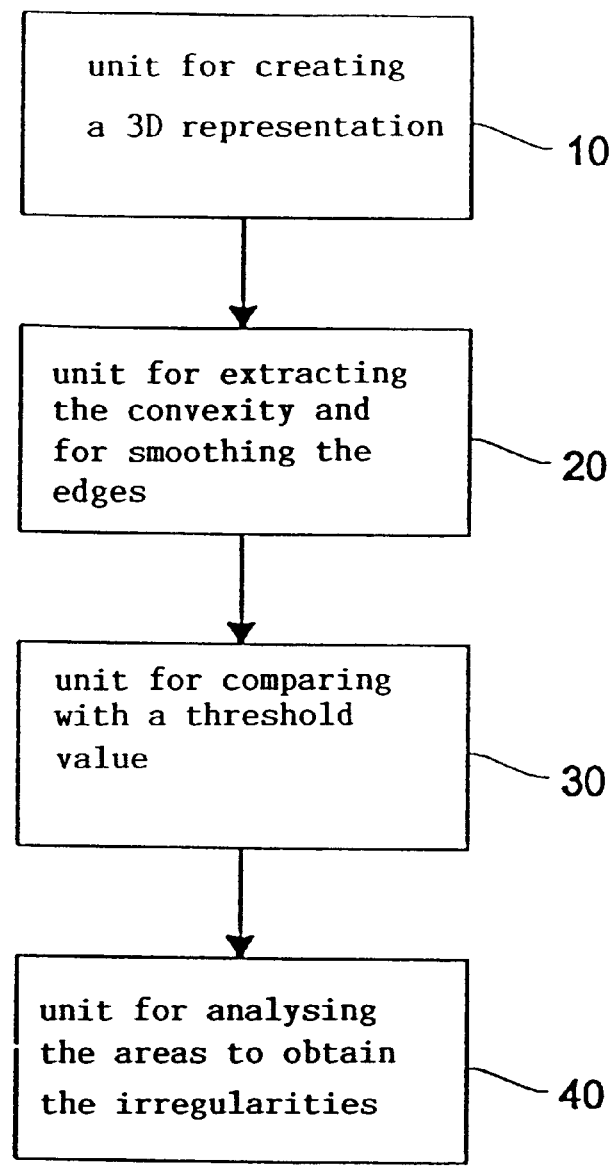
FIG. 1 shows a schematic diagram of the device and the method according to the present invention.
Figure 3:
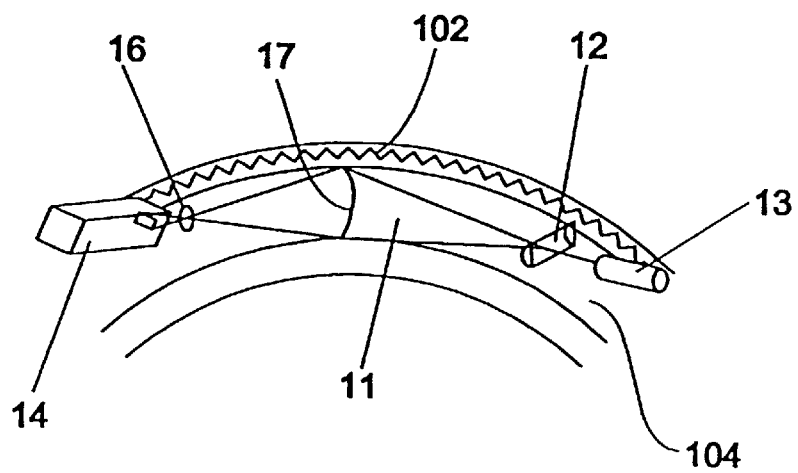
FIG. 3 shows a side view of the arrangement of FIG. 2.
Figure 4:
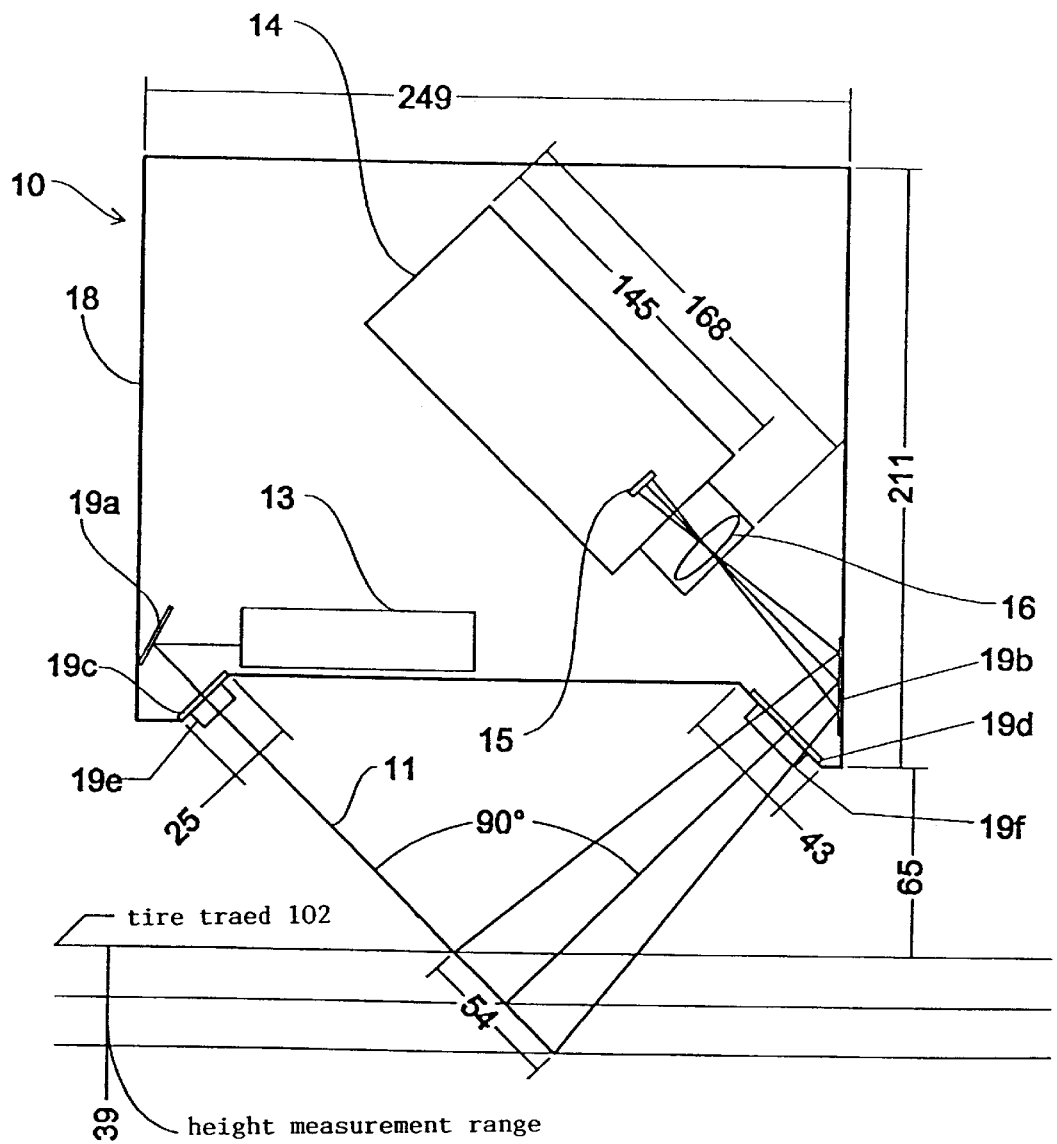
FIG. 4 shows a detailed representation of the unit for creating a three-dimensional representation of the surface according to a preferred embodiment.

Before discussing the device for the contactless detection of an essentially edge-free irregularity in a convex surface, shown in FIG. 1, in more detail, the unit 10 for creating a three-dimensional representation will be considered more closely with reference to FIG. 3 and FIG. 4. It should be pointed out that although the triangulatory measurement method using optical equipment is considered in detail in the following, the present invention is not restricted to such a method. In principle any device for creating a three-dimensional representation of the convex surface which operates contact free is acceptable.

Figure 2:
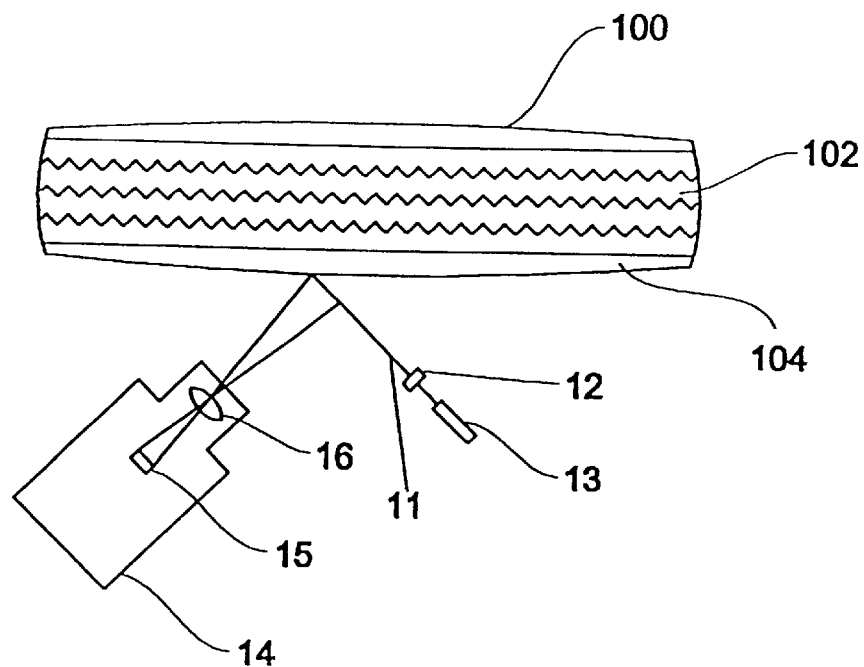
FIG. 2 shows a plan view of the arrangement for recording a three-dimensional representation of the convex surface.

FIG. 2 shows a vehicle tire 100, possessing a tread 102 with a schematically indicated profile and also a sidewall 104 which is to be investigated and which is generally a convex surface, according to a preferred embodiment of the present invention for the quality control of vehicle tires. In the tire checking embodiment the generally convex surface takes the form of a torus.

The sidewall 104 to be investigated is illuminated by a fan beam 11, which is produced by a cylindrical lens 12 from a laser beam generated by a laser 13. The fan beam 11 is diffusely reflected at the sidewall 104 and recorded by a camera 14 having an image sensor 15 and a lens 16.

FIG. 3 shows a side view of the arrangement shown from above in FIG. 2 in which the test area 17, which is determined by the width of the fan beam 11 at the sidewall 104, can be seen.

FIG. 4 shows a more detailed schematic representation of the unit 10 for creating a three-dimensional representation of the surface which is implemented as a scanner measurement head according to a preferred embodiment of the present invention. The numerals in the figure denote dimensions in nm for a practical implementation of the device to indicate the relative sizes.

To save space, mirrors 19a, 19b are furthermore provided in a scanner measurement head housing 18, which also contains measurement windows 19c, 19d and air diaphragms 19e, 19f. The housing is dustproof and the measurement windows 19c, 19d can be kept free of dust by a current of air. The height measurement range achievable with the scanner measurement head shown in FIG. 4 is about 39 mm. The height resolution is 76 $\mu$m (39 mm height/512 grey tones of the camera). The width of the measurement area on the tire sidewall is 80 mm. The height resolution is determined by the image sensor or by the grey sensitivity of the camera.

In the following the function of the arrangement shown in FIGS. 2 to 4 will be considered more closely. In the triangulatory principle, the light fan beam 11, which is generated by a laser with special aspherical lens optics in the form e.g. of the cylindrical lens 12, is first directed onto the surface to be investigated. The diffusely reflected radiation is then projected onto the sensor surface 15 of the camera via the lens system 16. From the known geometry of the measurement arrangement together with the position of the projected line on the sensor surface the form of the illuminated surface is then calculated in a manner which is known to persons skilled in the art.

The geometry of the arrangement of light fan beam 11 and measurement camera 14 together with the pixel resolution of the camera determine the spatial resolution of the measurement in the lateral and vertical directions. The egeometry is so chosen that the tire area 17 to be investigated is imaged on the sensor, employing e.g. a measurement range of 5 cm in the radial direction with a resolution of e.g. 0.5 mm, and a sufficient height resolution of 76 $\mu$m, determined essentially by the image sensor 15, is achieved at the same time. This permits an adequate representation of the irregularities to be detected, which lie in a height range exceeding 0.5 mm.

The spatial resolution of the measurement in the tangential direction, i.e. in the tire circumference direction, depends on the image repetition rate of the camera. The tangential spatial resolution for a preferred embodiment of the present invention is 1 mm. In addition, a tire should be checked within one second in practice. The resulting measurement rate, assuming a test area diameter of 0.6 m, is 1900 Hz. Sensors 15 which are particularly suitable for this test are manufactured by e.g. the firm IVP (type MAPP 2200 PCI). However, other image sensors which fulfill the cited specifications can equally well be used. A programmable computer architecture integrated on the sensor chip determines the height information on a column basis, so that only the evaluation result in the form of a line, i.e. of a height or profile line, has to be transferred to the measurement computer for each sensor image which is recorded.

Figure 5A:
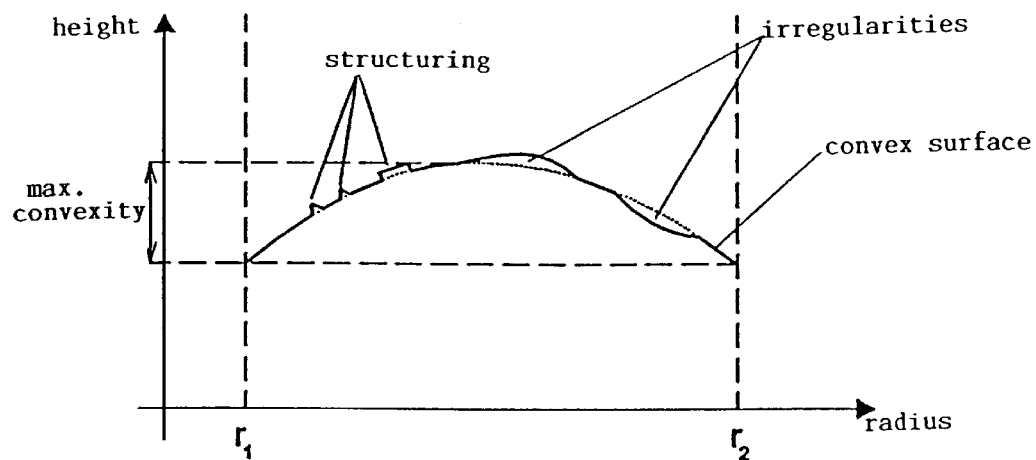
FIG. 5a shows a height line as created by the unit of FIG. 4.

Such a height line along the test region 17 is shown schematically in FIG. 5a. The x-axis denotes the radius of the tire while the y-axis denotes the height of a point along the radius in relation to some absolute value. As can be seen from FIG. 5a, a structuring can take the form of a triangular, quadrilateral or some other shaped protuberance which is delimited from the convex surface by edges. On the other hand, irregularities, such as bulges or constrictions, in a tire exhibit a continuous transition to the convex surface, which is indicated by points in the region of the structuring and of the irregularities to make matters clearer.

It should be noted that the schematic representation shown in FIG. 5a indicates only a single height line along the test region 17 (FIG. 3). When the tire 100 (FIG. 3) is rotated about its axis and the camera generates such a height line at corresponding intervals, a three-dimensional representation of the tire sidewall is obtained after a complete revolution of the tire 100. According to the present invention the three-dimensional height representation is fed into a digital data processing system, which may be a personal computer with display and operating functions, on which a sequence of image processing operations can be performed to obtain the essentially edge-free irregularity in the convex surface, i.e. a faulty tire. Effects which must be taken into account are the torus-shaped curvature of the tire sidewall and the possible existence of lateral runout in the tire, which must not lead to a fault being indicated since lateral runout does not necessarily lead to rejection of the tire.

Figure 5B:
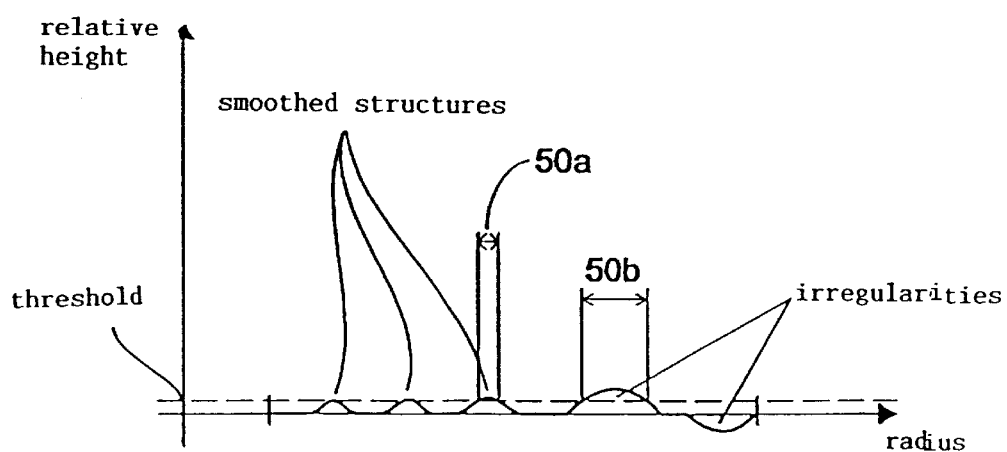
FIG. 5b shows a height line of the convex-free representation.

The digital data processing system comprises first the unit 20 for extracting the convexity and for smoothing the edges, which creates a convex-free representation, a single height line of which is shown in FIG. 5b. It can be seen that, for one thing, the convexity is extracted, which can have a maximum value of up to 4 cm. Furthermore, the edges of the structuring are so smoothed that they remain in FIG. 5bsimply as small protuberances whereas the irregularities which are present in the convex-free representation of FIG. 5b correspond essentially to the irregularities of the convex representation of FIG. 5a since selective image processing has been performed.

The convex-free representation shown in FIG. 5b can now be compared with a level threshold so as to identify areal regions of the convex-free representation, which are determined by a predetermined relationship to the threshold value. The unit 30 for comparing the convex-free representation, which is represented schematically in FIG. 5b, will provide two areal regions 50a, 50b, the first areal region 50a coming from the structuring and the second areal region 50b from the bulge. Through smoothing of the structuring the areal region 50a of the structuring above the threshold is reduced while the bulge is not affected by the selective data processing, which will be discussed later. This means that bulges can also be distinguished from structurings of similar dimensions. Assured bulge detection is thus achieved. In the unit 40 for analyzing the area of the identified regions 50a and 50b it is then automatically determined that the region 50a comes from the structuring while the region 50b comes from a bulge. This can be achieved by a threshold comparison wherein the threshold area is smaller than the area to be expected from bulges. It can also be seen from FIG. 5b that structurings with relatively thin cross-sections, such as those used to denote larger letters on tire sidewalls, are already fully suppressed by the edge smoothing and thus fall completely under the threshold. In the case of relatively high structurings, these are strongly attenuated and their areal regions above the threshold are also strongly reduced, whereby bulges can be distinguished easily and with certainty from structurings described above.

In the following the data processing of the three-dimensional representation of the surfaces so as to detect irregularities in a convex surface is discussed in more detail. It is clear from FIG. 5a that the spatial spectra of the structuring and of the irregularities differ in that the spatial spectrum of the structuring possesses much higher spectral components than the spectrum of the irregularities since the sharp edges produce high harmonics in the spectrum of the structuring. The essentially edge-free irregularities on the other hand have a spatial spectrum whose energy will rather be located in the lower range. The same is true of the spatial spectrum of the convex surface. Because of the gradual nature of the height change compared with the irregularities, the energy in this spectrum is strongly confined.

The complete spatial spectrum of the height line shown in FIG. 5a thus consists essentially of three regions. The region with the highest spatial frequencies is determined primarily by the structuring alone. A middle region is determined both by the structuring and by the irregularities, while the convexity of the convex surface manifests itself only in a spectral region covering very small spatial frequencies. As a result, it is in principle possible, by means of band-pass filtering of the height line shown in FIG. 5a, to achieve selective smoothing of the edges of the structuring without influencing the irregularities, also to extract the convexity of the convex surface if the lower cut-off frequency of the pass band of the band-pass filter is chosen to be smaller than the smallest frequency of the irregularities and if the upper cut-off frequency of the pass band is chosen to be higher than the highest frequency of the irregularities which is worth mentioning energywise. Filtering of this kind thus enables the convexity of the convex surface to be suppressed completely while the structuring is simply smoothed and remains of the same persist in the convex-free representation shown in FIG. 5b. Since the structuring seen in cross-section extends only a relatively small distance along a height line, smoothing of the edges also reduces the height of the structuring in the convex-free representation compared with the "true" height line, which does not apply to the irregularities, however. In this way selective influencing of the structuring is achieved by the present invention.

Figure 6:
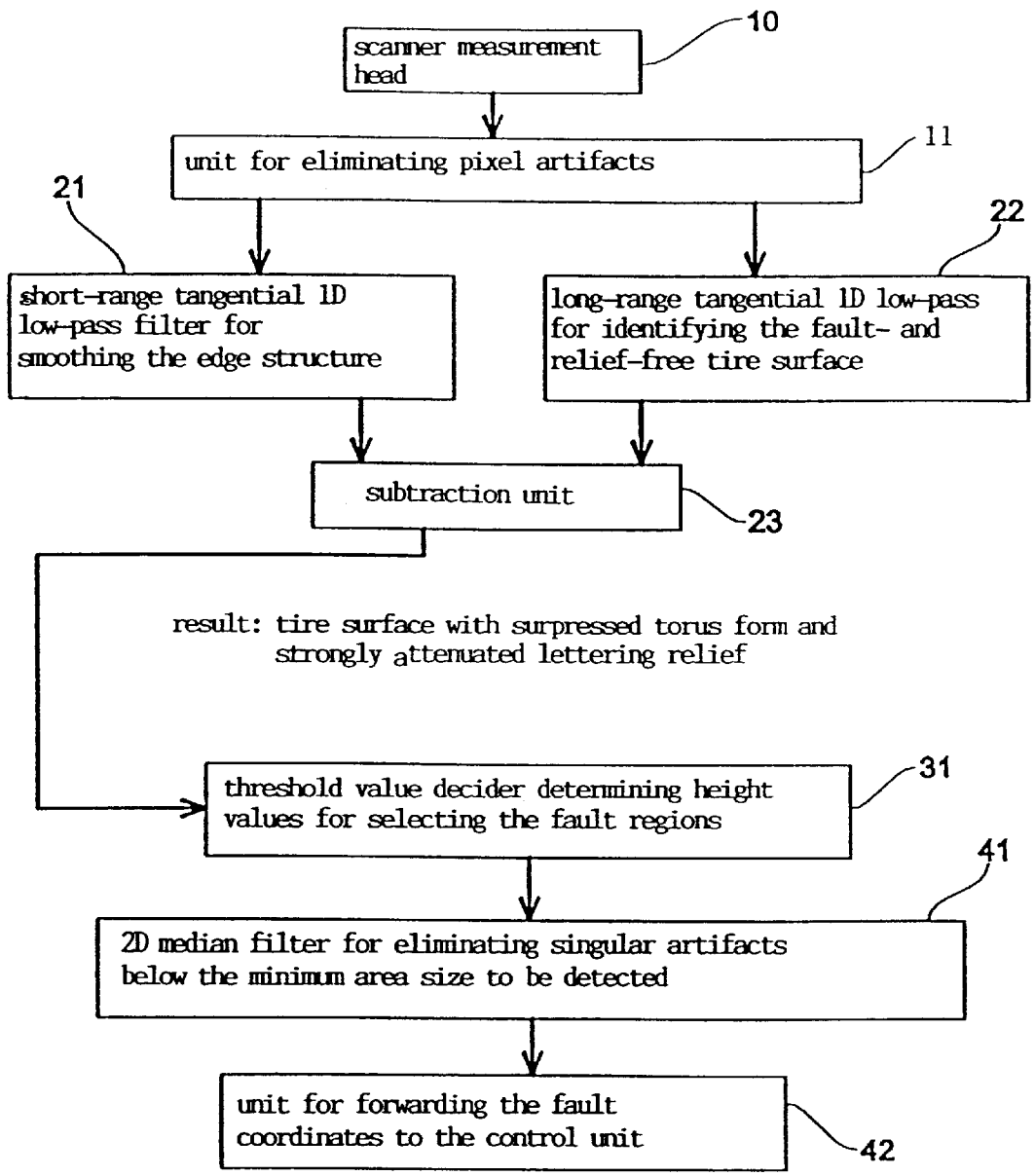
FIG. 6 shows a detailed block diagram for the device according to the present invention or for the method according to the present invention.

FIG. 6 shows a detailed block diagram of the device 10 according to the present invention in accordance with a preferred embodiment of the present invention for the industrial quality control of tires. The device shown in FIG. 6 first comprises the scanner measurement head 10, which is to be seen in FIG. 4 and in the FIGS. 2 and 3. Preferably the scanner measurement head 10, which creates the three-dimensional representation of the surface, is followed by a unit 51 for eliminating pixel artifacts to eliminate disturbed pixels for which, for recording reasons, no height information could be obtained or for which calculation errors have occurred. In the preferred embodiment of the present invention the unit 20 for extracting the convexity and smoothing the edges is composed of a short-range tangential one-dimensional low-pass filter 21 for smoothing the edges of the structuring, a long-range tangential one-dimensional low-pass filter 22 for identifying the fault- and relief-free tire surface and a subtraction unit 23 so as to obtain as result a convex-free representation of the tire surface in which the torus form is suppressed and the lettering relief is strongly attenuated. Through the action of the short-range tangential one-dimensional low-pass filter 21, whose cut-off frequency lies above the spectrum of the irregularities, the edges of the structuring are smoothed. Through the action of the long-range tangential one-dimensional low-pass filter 22 for identifying the fault- and relief-free tire surface, since its cut-off frequency lies below the spectrum of the irregularities, essentially just the convexity of the convex surface is obtained. Finally, the result of the low-pass filter 22 is subtracted from the result of the low-pass filter 21 by the subtraction unit 23 to obtain the cited result.

The unit 30 for comparing the convex-free representation with a threshold value comprises a threshold value decider 31, which determines a height value for selection or identification of the areal regions. Selection occurs for both positive (for identifying the bulges) and negative (for identifying the constrictions) height deviations in dependence on a predetermined detection lower limit for the fault structures. The result is an image in which potentially faulty areal regions are marked.

The unit 40 for analyzing the surfaces of the identified areal regions preferably comprises a two-dimensional median filter 41 for eliminating the areal regions 50a (FIG. 5b) due to structuring in such a way that the output signal in the sense of automatic real-time processing is just a representation of the sidewall of the tire in which the faulty regions due to essentially edge-free irregularities are marked. Via a unit 42, which can take the form of an interface for a display device or for a control unit, the results obtained can be forwarded and used as needed.

The tangential one-dimensional low-pass filter 21 for smoothing the edges of the structuring is preferably implemented as a linear one-dimensional low-pass filter. The long-range tangential one-dimensional low-pass filter 22 for identifying the fault- and relief-free tire surface is preferably implemented as a nonlinear one-dimensional low-pass filter in the tangential direction. The range, i.e. the cut-off frequency, of the filter is so dimensioned that bulges and constrictions are suppressed but the lateral runout of the tire, which manifests itself as an additional superimposed low-frequency height change, is retained.

The two-dimensional median filter 41 also serves to suppress singular artifacts below the minimal area size to be detected. Apart from the areal regions due to marking, signals may also be produced by normally singular rubber extrusions on the tire surface and also by processing faults. The size of the two-dimensional median filter thus determines the minimum fault size which is to be detected.

What is claimed is:

1. A device for the frictionless detection of a potentially existing essentially edge-free irregularity in a surface, the surface having a convexity, the surface having the irregularity, and the surface having a structuring, wherein the structuring is delimited by edges and does not constitute an irregularity, comprising:

a unit for creating a three-dimensional representation of the surface, the three-dimensional representation of the surface having the convexity, the irregularity and the structuring;

a unit for extracting, connected to the unit for creating, the unit for extracting being operative to extract the convexity from the three-dimensional representation of the surface created by the unit for creating and to smooth the edges of the structuring so as to obtain a representation of the surface, the representation of the surface not including the convexity of the surface, and including the irregularity and the structuring with smoothed edges;

a unit for comparing, connected to the unit for extracting, the unit for comparing being operative to compare the representation with a threshold so as to identify regions of the representation which are determined by a predetermined relationship to the threshold value to obtain identified regions; and a unit for analyzing, connected to the unit for comparing, the unit for analyzing being operative to analyze area values of the identified regions, wherein a region is detected as the irregularity if the area value of the region exceeds a predetermined area value.

2. A device according to claim 1, wherein the unit for extracting has a band-pass filter unit with an upper and a lower cut-off frequency, the lower cut-off frequency being so chosen that the convexity is suppressed and the upper out-off frequency is so chosen that the edges are smoothed but the irregularity is scarcely affected.

3. A device according to claim 1, wherein the unit for extracting comprises:

a first low-pass filter, whose cut-off frequency is so chosen that the edges are smoothed but the irregularity is not affected;

a second low-pass filter, whose cut-off frequency is so chosen that the convexity is suppressed; and a subtraction unit for subtracting the output signal of the second low-pass filter from the output signal of the first low-pass filter.

4. A device according to claim 1, wherein the unit for extracting has a non-linear filter.

5. A device according to claim 1, which also comprises:

a unit for eliminating pixel artifacts from the three-dimensional representation of the surface, the unit for eliminating being connected to the unit for creating.

6. A device according to claim 1, wherein the unit for analyzing has a unit for eliminating singular artifacts.

7. A device according to claim 1, wherein the unit for analyzing has a two-dimensional median filter so as not to suppress those regions which are greater than the predetermined area value so that an image of the surface is created in which the irregularity alone is marked.

8. A device according to claim 1, wherein the unit for creating comprises:

a laser with precircuited cylinder optics to generate a fan beam for illuminating the convex surface; and a matrix camera for detecting the diffuse fan beam reflected from the convex surface.

9. A device according to claim 8, wherein the surface is a tire, the essentially edge-free irregularity is a bulge or a constriction on a sidewall of the tire, and the structuring is a marking introduced on the sidewall, the laser and the matrix camera being so arranged that a radial height line of the tire is recorded and the unit for creating also comprises:

a control unit for controlling the image repetition rate of the matrix camera and the speed of rotation of the tire so as to obtain a desired spatial resolution in the tire circumference direction.

10. A device according to claim 9, wherein the matrix camera is arranged to record a height line of the torus-shaped sidewall in each photograph and the unit for creating comprises:

a matrix memory in which the height lines generated by the matrix camera are stored one after the other so as to obtain the three-dimensional representation of the tire sidewall.

11. A method for the frictionless detection of a potentially existing essentially edge-free irregularity in a surface, the surface having a convexity, the surface having the irregularity, and the surface having a structuring, wherein the structuring is delimited by edges and does not constitute an irregularity, comprising the following steps:

creating a three-dimensional representation of the surface, the three-dimensional representation of the surface having the convexity, the irregularity and the structuring;

extracting the convexity from the three-dimensional representation of the surface and smoothing the edges of the structuring so as to obtain a representation of the convex surface, the representation of the surface not including the convexity of the surface, and including the irregularity and the structuring with smoothed edges;

comparing the representation with a threshold so as to identify regions of the representation which are determined by a predetermined relationship to the threshold value to obtain identified regions; and analyzing area values of the identified regions, wherein a region is detected as the irregularity when the area value of the region exceeds a predetermined area value.

12. A method according to claim 11, which is used for the quality control of a tire, comprising the following steps:

detecting a bulge or constriction as the irregularity on a sidewall of the tire, the sidewall of the tire constituting the surface; and rejecting the tire if it has the bulge or the constriction.

* * * * *